United States Patent [19]

Tiemann

[11] Patent Number: 4,823,230

[45] Date of Patent: Apr. 18, 1989

[54] PRESSURE TRANSDUCER

[75] Inventor: Jerome J. Tiemann, Schenectady, N.Y.

[73] Assignee: General Electric Company, Schenectady, N.Y.

[21] Appl. No.: 164,300

[22] Filed: Mar. 4, 1988

[51] Int. Cl.$^4$ .......................... G01L 9/12; H01G 7/00
[52] U.S. Cl. ..................................... 361/283; 73/724; 29/25.42
[58] Field of Search ................. 361/283; 73/718, 724, 73/727; 29/25.42

[56] References Cited

U.S. PATENT DOCUMENTS

| | | | |
|---|---|---|---|
| 3,328,653 | 6/1967 | Wolf | 73/724 X |
| 3,993,939 | 11/1976 | Slavin et al. | 361/283 |
| 4,120,206 | 10/1978 | Rud | 361/283 |
| 4,129,042 | 12/1978 | Rosvold | 73/727 |
| 4,701,826 | 10/1987 | Mikkor | 361/283 |
| 4,711,130 | 12/1987 | Glas et al. | 73/724 X |

Primary Examiner—Donald A. Griffin
Attorney, Agent, or Firm—Geoffrey H. Krauss; James C. Davis, Jr.; Marvin Snyder

[57] ABSTRACT

A pressure transducer has a first electrode fabricated with a predetermined shape upon a substrate surface. A first insulator encloses that portion of the first electrode not enclosed by the substrate; a second insulator forms a wall to a predetermined height above the substrate surface, and outwardly adjacent to the entire periphery of the first electrode. The wall has a base in pressure-tight connection to the substrate and a top opposite to the base. A deflectable second electrode is fabricated in pressure-tight connection across the wall top to enclose, at a reference pressure, a cavity between the first and second electrodes and the wall; the height of the wall, the shape of the first and second electrodes and the deflection characteristics of said second electrode, with respect to pressure, are all predeterminately selected to provide a desired relationship of the capacitance between the first and second electrodes and the pressure incident upon that surface of the second electrode opposite to the cavity.

20 Claims, 2 Drawing Sheets

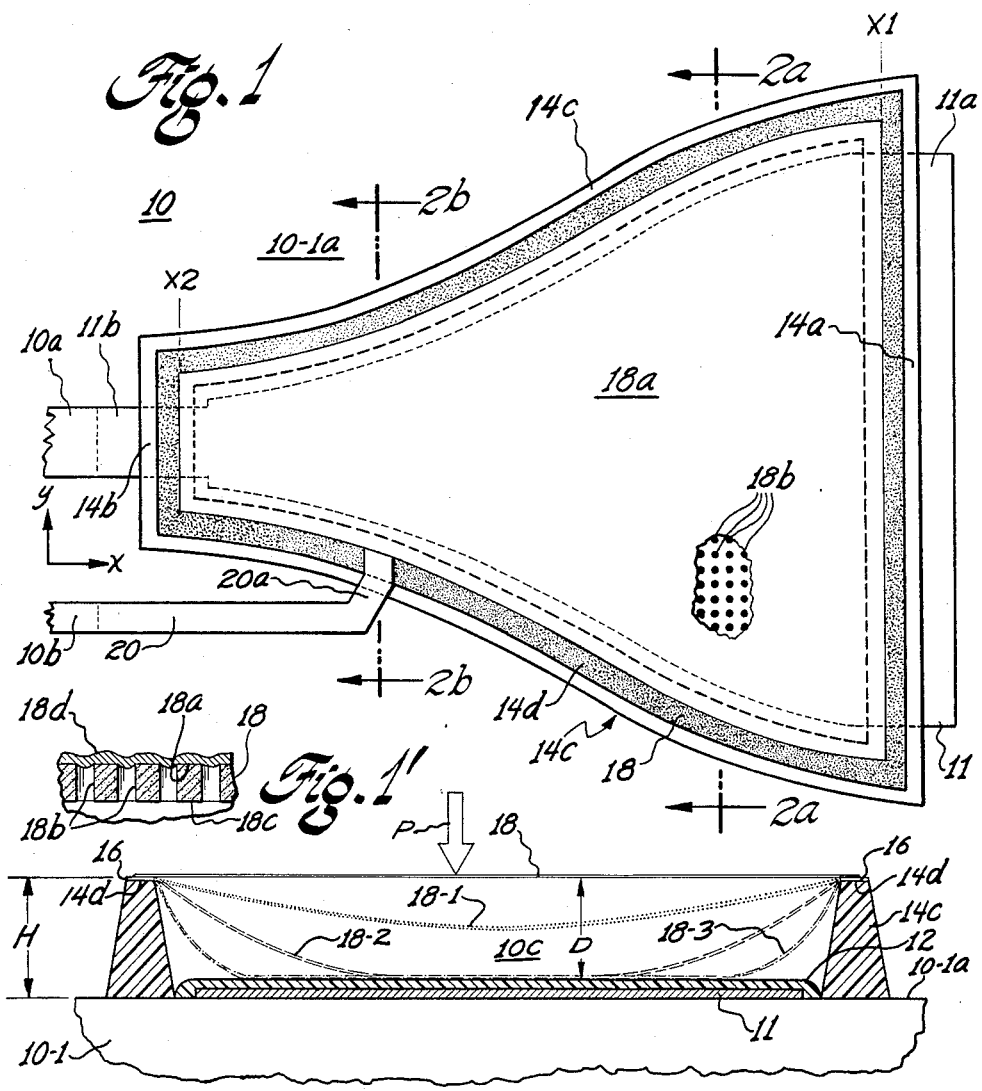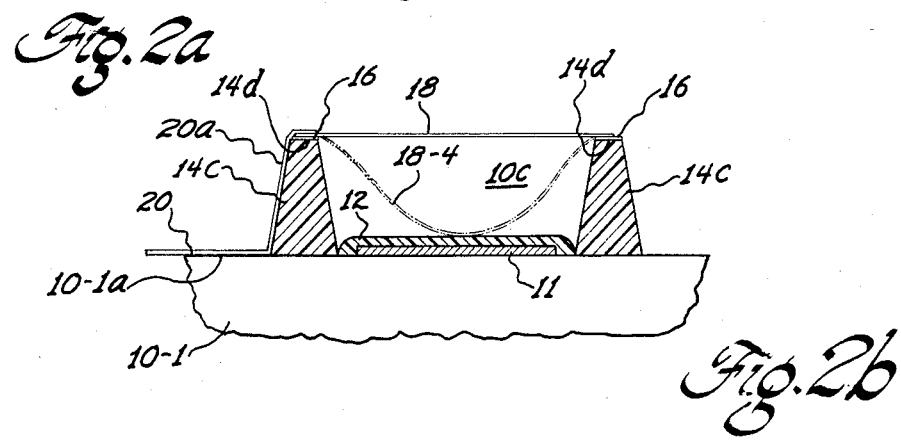

PRESSURE TRANSDUCER

BACKGROUND OF THE INVENTION

The present application relates to pressure transducers and, more particularly, to a novel pressure transducer of the deflecting membrane type, having increased dynamic range and substantially uniform relative sensitivity over an essentially arbitrary monotonic curve of capacitance versus pressure.

It is well known that there are many actual and potential uses for pressure sensors in today's high-technology environment. For example, in the transportation industries, almost all engines have at least one pressure transducer; in fact, an aircraft jet engine has several pressure transducers which must have a relative accuracy of about 1 percent of reading over a range spanning several decades of pressure. Because the tolerable error is extremely small at the lower-pressure end of the pressure range (when error is expressed as a fraction of full-scale range) these pressure transducers are relatively expensive. It is therefore highly desirable to provide a pressure transducer which not only has a wide dynamic range, but which also has a predetermined monotonic curve relating the input pressure to the magnitude of a predetermined electrical output parameter. That is, it is desirable to provide a response curve which has a well-defined input/output relationship; for example, an essentially logarithmic relationship of the output parameter, e.g. an electrical capacitance C, with changes in input pressure P (or $C = k \log P$, where k is a scale factor). It is also desirable that the pressure transducer have a predetermined sensitivity characteristic over its entire range, e.g. response that is accurate to within a constant fraction of the current reading, and the like. It is further desirable to provide a pressure transducer which is rugged and compatible with semiconductor technology, so that the transducer can be integrated upon a semiconductor integrated circuit chip.

PRIOR ART

Pressure transducers, based upon a change in the electrical capacitance between a deflecting conductive membrane electrode and an adjacent fixed electrode, are well known in the art. Pressure transducer designers know that a larger area capacitive transducer has a greater low-pressure sensitivity than a smaller area transducer, which latter type, conversely, has a greater high-pressure sensitivity. The state-of-the-art at the present time suggests that a combination of separate transducers, one having superior low-pressure sensitivity and the other having superior high-pressure sensitivity (with perhaps additional transducers having optimum sensitivity at intermediate pressures therebetween) may be more cost effective than utilizing a single transducer with very high pressure sensitivity. This is so because the average pressure transducer, particularly of the capacitive type, is sensitive over a smaller range of pressure than that pressure range required in large dynamic range applications, such as the aircraft engine control application previously mentioned hereinabove.

BRIEF DESCRIPTION OF THE INVENTION

In accordance with the invention, a pressure transducer comprises: a first electrode fabricated with a predetermined shape upon a substrate surface; a first insulator enclosing that portion of the first electrode not enclosed by the substrate; a second insulator forming a wall to a predetermined height above the substrate surface and outwardly adjacent to the entire periphery of the first electrode, said wall having a base in pressure-tight connection to the substrate and a top opposite to said base; and a deflectable second electrode fabricated in pressure-tight connection across the wall top to enclose, at a reference pressure, a cavity between said first and second electrodes and said wall; the height of said wall, the shape of said first and second electrodes and the deflection characteristics of said second electrode with respect to pressure, being predeterminately selected to provide a desired relationship of the capacitance between said first and second electrodes and the pressure incident upon that surface of said second electrode opposite to said cavity.

In a presently preferred embodiment, the transducer is fabricated by: fabricating the first electrode and then covering all of the first electrode and at least an adjacent portion of the substrate surface with a layer of a first insulative material; fabricating a layer of a second insulative material, different from the first layer material, to cover all of the first layer to at least beyond an imaginary line defining the periphery of the cavity to be formed, and to a predetermined depth; fabricating a thin film of a conductive second electrode material upon the second insulator layer free surface opposite to the substrate surface; forming an array of a plurality of apertures through the second electrode film; introducing, through the apertures, an etchant which does not appreciable affect the first insulator and second electrode materials and which dissolves away second insulator layer material between the first layer and second electrode in an amount sufficient to form the cavity of a desired shape and with a wall of second insulator material extending in pressure-tight manner between the substrate surface and second electrode; and then applying sufficient amounts of second electrode material to seal closed all of the apertures and the cavity.

Accordingly, it is an object of the present invention to provide a novel pressure transducer having a relatively large dynamic range and uniform relative sensitivity, while being capable of fabrication utilizing semiconductor integrated circuit technology.

This and other objects of the present invention will become apparent upon a reading of the following detailed description, when considered in conjunction with the drawings.

BRIEF DESCRIPTION OF THE DRAWINGS

FIG. 1 is a plan view of a presently preferred embodiment of a pressure transducer in accordance with the principles of the present invention;

FIG. 1' is a sectional view through a portion of the conductive membrane, or film-type, second electrode of the present invention;

FIGS. 2a and 2b are sectional side views through the transducer of FIG. 1, at two different points along the major dimension thereof, and illustrating second conductive electrode deflection at different pressures, and useful in comprehension of the operation of my novel pressure transducer.

DETAILED DESCRIPTION OF THE INVENTION

Figure 1A:
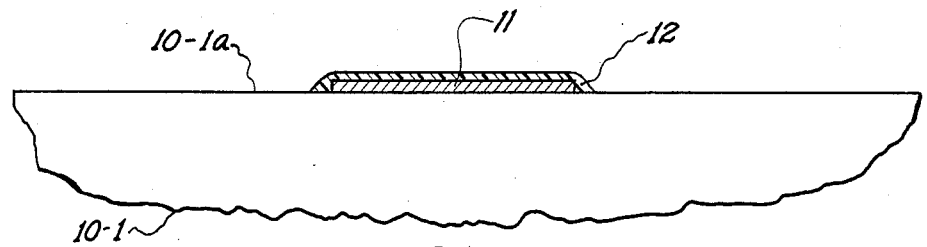
FIGS. 1a, 1b and 1c are sectional side views illustrating several points concerning the fabrication of the sensor.

Referring initially to FIGS. 1, 1' and 1a–1c, a presently preferred embodiment of my novel pressure transducer 10 is fabricated upon a surface 10-1a of a substrate 10-1 of a non-conductive material, such as a ceramic or semiconductor substrate of a hybrid or integrated electronic circuit, and the like (see FIG. 1a). A first conductive electrode 11 is fabricated upon substrate surface 10-1a; first electrode 11 can be fabricated of any conductive material compatible with the material of the underlying substrate. A first insulative material of a first insulative layer 12 is fabricated to cover the first electrode, at least to the extend that the electrode is located within the transducer area. That is, first electrode 11 has a first end 11a (see FIG. 1) and a second end 11b each of which either extend past or define opposite sides of the transducer area along a major axis x; the active area of transducer 10 is present between x-axis locations X1 and X2. A first transducer lead 10a is the continuation of the conductive first electrode, as from the narrow second end 11b thereof.

Transducer 10 includes an insulative supporting wall 14 fabricated upon substrate surface 10-1a beyond the periphery of first electrode 11 and its associated insulative coating 12; wall 14 preferably has a substantially constant height H (see FIG. 2a) and has a predetermined shape which continuously encloses the entire transducer area. Wall 14 includes (FIG. 1) a first end wall portion 14a, with its interior edge outwardly adjacent to line X1, and a second end wall portion 14b, with its interior edge outwardly adjacent to line X2; end wall portions 14a and 14b are connected by continuous, opposed side wall portions 14c. The dimensions of first and second end support wall portions 14a and 14b and the shape of curved support side wall portions 14c are determined by a generally curved, but monotonic, equation $y = f(x)$. The insulative support wall 14 has a cross section with a substantially flat top portion 14d (emphasized by stippling in the plan view of FIG. 1). A metallization layer 16 (see FIG. 2a) is preferably fabricated upon the support wall top surface 14d, so that a thin film membrane second electrode 18 of an elastically-deflecting conductive material can be fabricated in attachment to the continuous support wall top portions 14d so as to complete the pressure-tight enclosure of a cavity 10c formed between second conductor 18, the interior surface of support wall 14, the top surface of insulative layer 12, and any portion of substrate top surface 10-1a between support wall 14 and insulator 12.

Figure 1B:
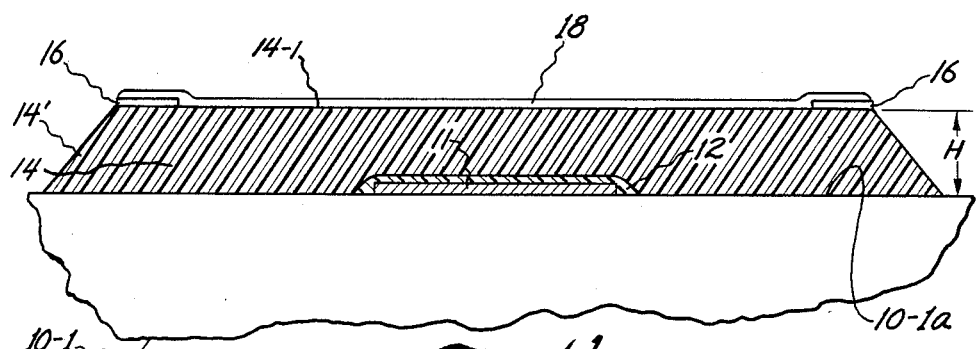
Figure 1C:
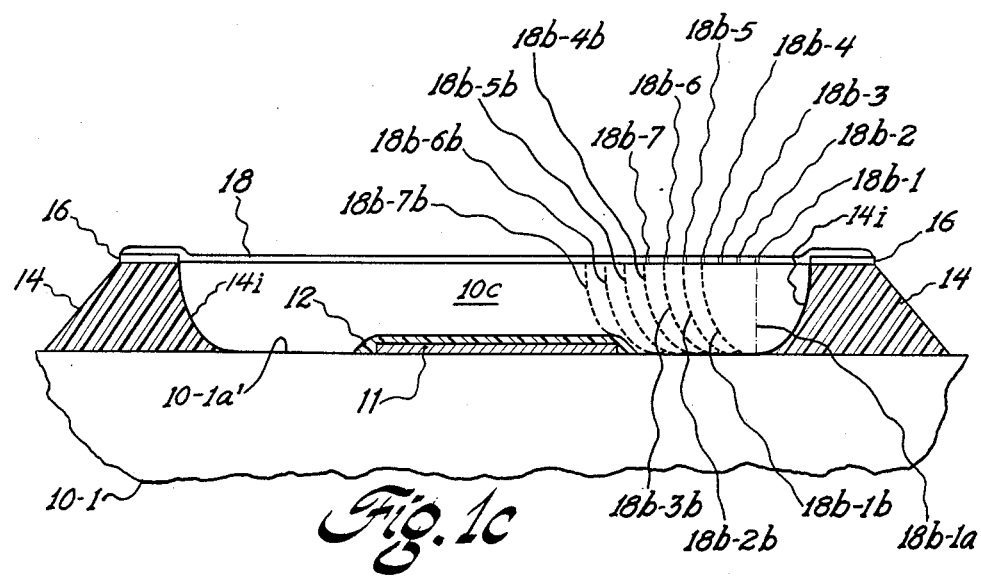

Referring now particularly to FIGS. 1' and 1a–1c, transducer 10 with hermetically-sealed cavity 10c is fabricated by the following process: first, as shown in FIG. 1a, the metallization of first electrode 11 on substrate top surface 10-1a is carried out and first electrode is covered with the first insulative layer 12. Next, as shown in FIG. 1b, a layer 14 of a second insulative material is formed atop substrate top surface 10-1a, enclosing all of first insulator 12; layer 14 is formed to the desired height H (on the order of 100 microns). The edge metallization layer 16 is then fabricated upon the second insulator layer top surface 14-1. Layer 16 may typically be formed with substantially constant thickness and substantially constant width and with a shape defining the edges of the transducer top electrode. A layer of the conductive material of second electrode 18 is then formed to cover all of the wall top surface 14-1, between the opposed portions of metallization 16. The upper surface 18a of the second electrode metallization layer is covered with a suitable resist material (not shown) and an array of holes are formed therethrough; an etchant is introduced to form an array of apertures 18b through the second electrode thin film layer (see FIGS. 1 and 1'). Thereafter, a second etchant is applied, through the second electrode apertures 18b; this second etchant does not appreciably affect the materials of metallization 16 (if used), thin film membrane layer 18 or first insulative material layer 12, but only the underlying second insulative material of layer 14. If desired, a suitable protective layer of the first, or another, insulative material can be applied to the exterior elevations 14' of the support wall, to prevent etching thereof. The second etchant removes (FIG. 1c) the underlying portions of second insulative material layer 14, as schematically shown by a removed portion 18b-1b, substantially symmetrically about the etching axis 18b-1a associated with a second electrode layer first aperture 18b-1. Similarly, other portions of layer 14 will be etched away, with the left-ward extent of the etched portion from each of apertures 18b-2, 18b-3, 18b-4, . . . , corresponding to broken curves 18b-2b, 18b-3b, 18b-4b, . . . Thus, the etched cavity 10c has an upper boundary formed by the second, or top, electrode 18, a lower boundary formed by the first insulative layer 12 and such portions 10-1a' of the substrate upper surface as are exposed (the second etchant also being selected to not substantially affect the material of substrate 10-1). The lateral boundaries of cavity 10c are formed by the interior surface 14i of the enclosing wall, which surface 14i will typically have a curvature in the vertical direction.

The interior cavity 10c is sealed, after being filled with a chosen gas at a chosen pressure, by directing additional second electrode material at the second electrode top surface 18a, to attach to the non-apertured portions 18c thereof and form an overfill 18d which adheres thereto to completely close all of apertures 18b in pressure-tight manner. As a final step, a second transducer conductive lead 20 (FIGS. 1 and 2b) is fabricated upon a portion of the substrate surface exterior of support wall 14, and has a portion 20a which integrally connects the lead 20 with the second conductive electrode 18; a second transducer lead 10b is a continuation of the conductive second electrode 20. The capacitance C between first electrode 11 and second electrode 18 can now be measured by electronic circuitry connected to leads 10a and 10b. It will be understood that this circuitry can be integrated into substrate 10-1. It will be further understood that, when apertures 18 are sealed, cavity 10c contains a reference volume of a reference atmosphere at a reference pressure; the exact chemical composition and physical parameters (pressure, temperature and the like) of the cavity-filling gas can be selected to provide the completed pressure transducer 10 with desired physical characteristics, such as for compensating temperature variations to which the transducer is subject and the like.

Referring now to FIGS. 1, 2a and 2b, in operation, when the external pressure P is equal to the internal pressure of the gas in cavity 10c, upper electrode 18 is substantially undeflected and has a reference capacitance with respect to first electrode 11. Although the transducer 10 will function for a range of external pressure P less than the reference pressure of the gas in cavity 10c, it is contemplated that typical operation will be with external pressure P greater than the reference cavity pressure. As the external pressure P is increased above the reference cavity pressure, the second electrode 18 is deflected downwardly towards first electrode 11. At low pressures, portions of second electrode 18 adjacent to the wider cavity end (adjacent to line X1) will deflect very easily, while at higher pressures, portions of electrode 18 nearer to the narrow end 11b (adjacent to line X2) will begin to deflect. At higher pressures, the easily-deflected, high-compliance region at the wider cavity end will "bottom out", but is prevented from shorting to first electrode 11 by the presence of insulative layer 12. The maximum deflection distance D is selected to prevent deflecting electrode 18 from exceeding its elastic limit. To provide substantially constant relative pressure accuracy, wherein each increment of transducer terminal capacitance is responsive to an increment of pressure which is proportional to the current pressure, a "horn" shape of wall 14 may be designed, with the location and size of the upper electrode region then undergoing increased deflection at any particular pressure, being determined by the use of an appropriate mechanical design tool, such as a finite element computer-aided design program and the like.

Pressure-to-capacitance transducer 10 has a maximum sensitivity at low pressure and has a decreasing sensitivity with increasing pressure and upper electrode deflection. In the specific embodiment illustrated herein, with the deflecting thin film electrode geometry being elongated along a major axis x in the rest plane of the electrode, and with variable distance between the supporting sidewalls 14c along a minor axis y, deflection at the wider end of electrode 18 will be greatest as pressure is increased from the rest pressure. Thus, the top electrode is deflected continuously downward; at a first pressure $P_1$, greater than the reference pressure $P_0$, the top electrode has a shape as shown by electrode 18-1, near the wider transducer end, in FIG. 2a. At the same time, the deflection of top electrode 18 at the narrow end (as shown in FIG. 2b) will be substantially negligible. For a somewhat greater pressure $P_2 > P_1$, the wide-end deflection will be even greater, as shown by increasingly-downwardly-deflected electrode 18-2. The pressure can be further increased until the top electrode, near its wide end, "bottoms out". For even greater pressure $P_3 > P_2$, electrode 18-3 bottoms out to an increasingly greater extent against the top surface of first insulative layer 12; capacitance increases until the downward deflection ceases at any particular Y line (perpendicular to the X direction along the major sensor axis). Even then, a region closer to the transducer narrower end will still continue to display deflection and the device will still display sensitivity. Thus, the deflection of upper electrode 18 at the narrow end will increase for even greater pressures, until, at some pressure $P_4 > P_3$, the downwardly deflected upper electrode 18-4 will contact the first insulative layer. Thereafter, a maximum pressure $P_m$ is reached at which a maximum amount of the upper electrode 18, adjacent the narrower end of the transducer, has "bottomed out" and no further deformation occurs; the maximum capacitance is exhibited.

The pressure sensitivity is a function of geometry at a particular location along the elongated transducer dimension (X). It is possible to tailor the sensitivity at a particular pressure by tailoring the slope of the deflecting electrode boundary. Because of the concentration of stress at the edge of the transducer cavity 10c when the elastic film upper electrode 18 deforms under the influence of external pressure P, a fairly sharp angle may develop at the high pressure limit, at the interior upper edge of wall 14/metallizing layer 16, if used. The film of layer 18 is therefore subjected to very large tension at its outer surface and very large compression at the surface in contact with the edge of the cavity at wall 14 (and/or layer 16, if used). It is contemplated that the strain will not exceed a few tenths of one percent of the elastic limit of the film material. For example, if film 18 is tungsten of about 1 micron thickness, then less than 1% of the elastic limit is reached, at a maximum external pressure P of 50 atmospheres, for a circular cavity of about 10–20 microns diameter. An identical geometry can be maintained at the edges of an arbitrarily large-diameter cavity, if there is an insulating support about 0.1 microns beneath the elastic film. Thus, the width of the transducer at narrow end X2 is on the order of 15 microns wide for the deflecting thin film electrode 18 to just reach the insulating support layer 12, near the narrow end of the transducer, with an external pressure P of 50 atmospheres. Even though the film in the wider portions of the transducer will have bottomed out at somewhat lower pressures, the edges will have the same deflection geometry because the support will hold the deflection at 0.1 microns and provide a zero slope boundary condition at the same distance from the edges as in the narrower region of the transducer.

The hermetic deflecting thin-film member, which desirably is extremely elastic (with as little sensitivity to vibration or creep as possible), can be a ductile metal, or even more attractively, a refractory metal. Advantageously, the cavity is fabricated by utilizing silicon dioxide for the second insulative material and tungsten as the material for electrode 18. Because tungsten can be selectively deposited, i.e. deposited only where previous tungsten exists, the selective deposition of additional tungsten for portions 18d, sealing apertures 18b, is attractive. The use of tungsten and silicon dioxide allows the use of hydrofluoric acid for the second insulative material etchant.

While one presently preferred embodiment of my novel pressure transducer is described in detail herein, many modifications and variations will now become apparent to those skilled in the art. It is my intent, therefore, to be limited only by the scope of the appending claims and not by the specific details and instrumentalities presented by way of explanation herein.

What I claim is:
1. A pressure-to-capacitance transducer, comprising:
a substrate having a surface;
a first electrode formed of a conductive material upon said substrate surface and having a preselected shape;
a layer of an insulative material covering at least those surfaces of said first electrode not in abutment with said substrate;
a support wall of an insulative material extending above said substrate surface and having a periphery, completely enclosing the active area of said transducer, with a base joined to one of said insulative layer and said substrate in a pressure-tight manner and having a top portion opposite to the base portion; and
a second electrode joined to the support wall top portion completely around the wall periphery and hermetically enclosing a cavity, defined between facing interior surfaces of said wall and said first and second electrodes, of a generally trapezoidal geometry in a plane substantially parallel to said surface and having a first portion wider than a second opposed portion thereof, said second electrode being formed of a conductive material thin film which deflects toward said first electrode with relatively high sensitivity in said first portion and relatively low sensitivity in said second portion responsive to relatively low pressure, and with relatively low sensitivity in said first portion and relatively high sensitivity in said second portion responsive to relatively high pressure, applied to that surface of said second electrode opposed to said cavity, with monotonically increasing electrical capacitance, between said first and second electrodes, for increasing applied pressures greater than a reference pressure in said cavity.

2. The transducer of claim 1, wherein said wall has a substantially constant height, above said substrate surface, along the entire periphery.

3. The transducer of claim 2, wherein said wall has opposed first and second end portions defining the maximum extent of the transducer along a preselected major axis.

4. The transducer of claim 3, wherein the wall also has a pair of side portions, each having opposite ends joined to juxtaposed opposite ends of the end portions of said wall.

5. The transducer of claim 4, wherein the first and second end portions are substantially parallel to one another.

6. The transducer of claim 5, wherein the wall side portions are substantially symmetrically disposed with respect to a major axis of the transducer.

7. The transducer of claim 3, wherein the first wall end portion is of greater dimension than the second wall end portion.

8. The transducer of claim 1, further comprising another layer of material interposed between the top portion of said wall and the second electrode, and of a shape selected to limit the strain placed on the second electrode at the maximum pressure-responsive deflection thereof.

9. The transducer of claim 8, wherein said another layer is fabricated of the same material as said second electrode.

10. The transducer of claim 1, further comprising a gas, filling said cavity and selected to at least partially temperature-compensate the pressure-versus-capacitance curve of said transducer.

11. A method for fabricating a pressure-to-capacitance transducer, comprising the steps of:
(a) providing a substrate having a surface;
(b) fabricating a first conductive electrode, having a preselected shape, upon the substrate surface;
(c) fabricating a layer of a first insulative material covering all portions of the first electrode not in abutment with the substrate;
(d) covering at least a portion of the first insulative layer with a layer of a second insulative material, different from the first insulative material, with the second insulative layer having a free surface opposite to the substrate;
(e) fabricating, upon the second insulative layer free surface, a second electrode as a thin film of a second material and having another preselected shape; and
(f) removing a portion of the second insulative layer to form a cavity bounded by (1) the second electrode and at least one of the first insulative layer and the substrate and (2) a continuous wall of the second insulative material extending in pressure-tight manner between the second electrode and at least one of the first insulative layer and the substrate.

12. The method of claim 11, wherein step (f) includes the steps of: (f1) forming an array of apertures through the second electrode; (f2) introducing through the apertures an etchant selected to remove a predetermined volume of the second insulative layer material while not substantially removing any of the materials of the first insulative layer, the second electrode and the substrate; and (f3) then closing all of the apertures in the second electrode to hermetically seal the underlying cavity.

13. The method of claim 12, further comprising the step of covering an exterior surface of the second insulative layer with a non-etchable material prior to commencement of step (f2).

14. The method of claim 12, further comprising the step of filling the cavity volume with a gas at a second reference pressure prior to sealing the cavity.

15. The method of claim 14, further comprising the step of selecting the cavity-filling gas to at least partially temperature-compensate the pressure-versus-capacitance curve of the transducer.

16. The method of claim 11, wherein step (e) includes the step of fabricating as a narrow ribbon having a shape defining the outer edge of the second electrode, an intermediate layer of a selected material between the second insulative layer free surface and the second electrode.

17. The method of claim 16, wherein the intermediate layer and second electrode are fabricated of the same conductive material.

18. The method of claim 17, wherein the conductive material is a selectively deposited material.

19. The method of claim 18, wherein the conductive material is tungsten.

20. The method of claim 19, wherein the second insulative layer is fabricated of silicon dioxide.

* * * * *